(12) United States Patent
Brogårdh et al.

(10) Patent No.: US 6,205,839 B1
(45) Date of Patent: *Mar. 27, 2001

(54) DEVICE AND METHOD FOR CALIBRATION OF A MULTI-AXIS INDUSTRIAL ROBOT

(75) Inventors: Torgny Brogårdh; John-Erik Snell, both of Västerås (SE)

(73) Assignee: Asea Brown Bovreri AB, Vasteras (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/913,887
(22) PCT Filed: Mar. 21, 1996
(86) PCT No.: PCT/SE96/00353
   § 371 Date: Sep. 25, 1997
   § 102(e) Date: Sep. 25, 1997
(87) PCT Pub. No.: WO96/30170
   PCT Pub. Date: Oct. 3, 1996

(30) Foreign Application Priority Data

Mar. 29, 1995 (SE) .................................................. 9501124

(51) Int. Cl.[7] .............................. G01B 11/26; B25J 19/02
(52) U.S. Cl. ....................... 73/1.79; 73/1.75; 318/568.16; 318/568.22; 901/46; 901/47
(58) Field of Search ................. 318/568.16, 568.22, 318/568.23, 568.24, 568.25; 901/2, 9, 14, 15, 16, 46, 47, 41, 42, 43; 73/1.75, 1.79

(56) References Cited

U.S. PATENT DOCUMENTS

| 4,435,905 | | 3/1984 | Bryan ................................ 33/181 R |
| 4,804,897 | * | 2/1989 | Gordon et al. ................... 318/568.11 |
| 4,883,938 | * | 11/1989 | Sarugaku ............................ 901/42 X |
| 5,151,007 | * | 9/1992 | Maruo ................................. 901/15 X |
| 5,239,855 | | 8/1993 | Schleifer et al. . |
| 5,343,397 | * | 8/1994 | Yoshino et al. ................. 318/568.16 |
| 5,404,086 | * | 4/1995 | Takenaka et al. .............. 318/568.12 |
| 5,448,146 | * | 9/1995 | Erlbacher ........................ 318/568.17 |
| 5,668,453 | * | 9/1997 | Muto et al. ...................... 318/568.17 |

FOREIGN PATENT DOCUMENTS

| 44 19 909 A1 | | 12/1997 | (DE) . |
| 69911 | * | 3/1989 | (JP) . |

* cited by examiner

Primary Examiner—Thomas P. Noland
(74) Attorney, Agent, or Firm—Pollock, Vande Sande & Amernick (57) ABSTRACT

An equipment for calibration of an industrial robot which has a plurality of axes of rotation and wherein, the equipment comprises a measuring device is adapted for rotatable connection to a reference point the position of which is known, is adapted to be in contact with the robot, or a tool carried by the robot, during the calibration process, and has an axis of rotation which intersects the reference point when the measuring device is connected to the reference point. The measuring device further comprises a gravity sensor which is so mounted so that the axis of the gravity sensor is substantially parallel to the axis of rotation of the measuring device, whereby the gravity sensor measures the angle between the gravity vector and axis of rotation.

13 Claims, 13 Drawing Sheets

DEVICE AND METHOD FOR CALIBRATION OF A MULTI-AXIS INDUSTRIAL ROBOT

TECHNICAL FIELD

The present invention relates to a method for calibration of an industrial robot.

The invention also relates to equipment for calibration of the above-mentioned robot.

BACKGROUND OF THE INVENTION

An industrial robot may be viewed as a chain consisting of stiff links. Two links are joined to each other in such a way that they are rotatable in relation to each other around an axis of rotation, or displaceable in relation to each other along a linear movement path. An industrial robot usually has six axes of rotation. The last link in the chain may consist of a tool which, depending on the field of application, may be a gripper, a glue gun or a welding gun. In the following, the links in a robot will be referred to as arms, and their lengths will be referred to as arm's lengths.

For each of the axes of rotation or linear movement paths, servo equipment with a driving motor and a position transducer is provided, the transducer delivering a signal which is a measure of the angle of rotation of the actual axis in relation to a reference position. The servo system of each axis is supplied with a reference value of the angle of rotation or linear movement of the axis, and the driving motor of the axis causes the robot to move until the axis position indicated by the position transducer of the axis corresponds to the reference value supplied to the servo system. In order for the position and orientation of the tool to correspond to the desired values, the mechanical structure of the robot and the parameters, so-called kinematic parameters, which describe it must be known with a high accuracy. Since the kinematic parameters are not exactly the same for each robot, the individual deviations from an ideal robot, that is, the kinematic error parameters of the robot, must be known if a high accuracy is to be attained.

Examples of kinematic error parameters are variations in the lengths of the arms, so-called arm's length errors, obliquities in the axes of rotation in relation to each other, so-called axis-attitude errors, and lateral displacements of the axes in relation to each other, so-called axis-offset errors. These deviations arise during manufacture of the different mechanical components and during the assembly thereof. To this it is to be added the fact that the angle indicated by the position transducer of an axis must with great accuracy correspond to the actual angle of rotation of the arm which is controlled with the aid of the axis in question, so-called synchronizing errors.

For determining the deviation of an individual robot from an ideal robot, various forms of calibration methods are used. A large number of calibration methods are known. A disadvantage with certain of these methods is that they do not manage to make a complete calibration, that is, determine both arm's length errors, axis-attitude errors, axis-offset errors, synchronizing errors, transmission errors, and deflection errors for all of the axes of the robot. A disadvantage with the known methods which do manage to make a complete calibration is that they require expensive and delicate calibration equipment, for example theodolites.

SUMMARY OF THE INVENTION

The object of the invention is to provide a calibration method which manages to calibrate all the axes of a six-axis robot, as well as the mounting of the tool and the mounting of the robot foot, manages to calibrate arm's length errors, axis-attitude errors, axis-offset errors, synchronizing errors, transmission errors, does not require expensive equipment, provides high accuracy, can be used under active-service conditions, for example in a production line for cars, can be used without the robot-carried tool having to be dismantled, can be used for fully-automatic calibration, for example during final testing of robots, and is fast and can be performed without complicated adjustments of robot positions.

The invention also aims to provide calibration equipment to be used with the above-mentioned calibration method, wherein the equipment is inexpensive, is robust enough to endure a workshop environment, is portable and hence easy to transport, and does not need to be calibrated.

The configuration of the robot is defined by the angles of the axes of rotation thereof, and one configuration distinguishes from another if at least some of the angles of axes are changed.

BRIEF DESCRIPTION OF THE DRAWINGS

FIGS. 5a–5d schematically show an embodiment of measuring equipment according to the invention, which is suitable for use in an automatic calibration method. FIG. 5b shows a section A—A in FIG. 5a.

FIGS. 8 and 8a and 8b show an embodiment of measuring equipment according to the invention, which comprises an optical measuring system.

DETAILED DESCRIPTION OF THE PREFERRED EMBODIMENTS

Figure 1:
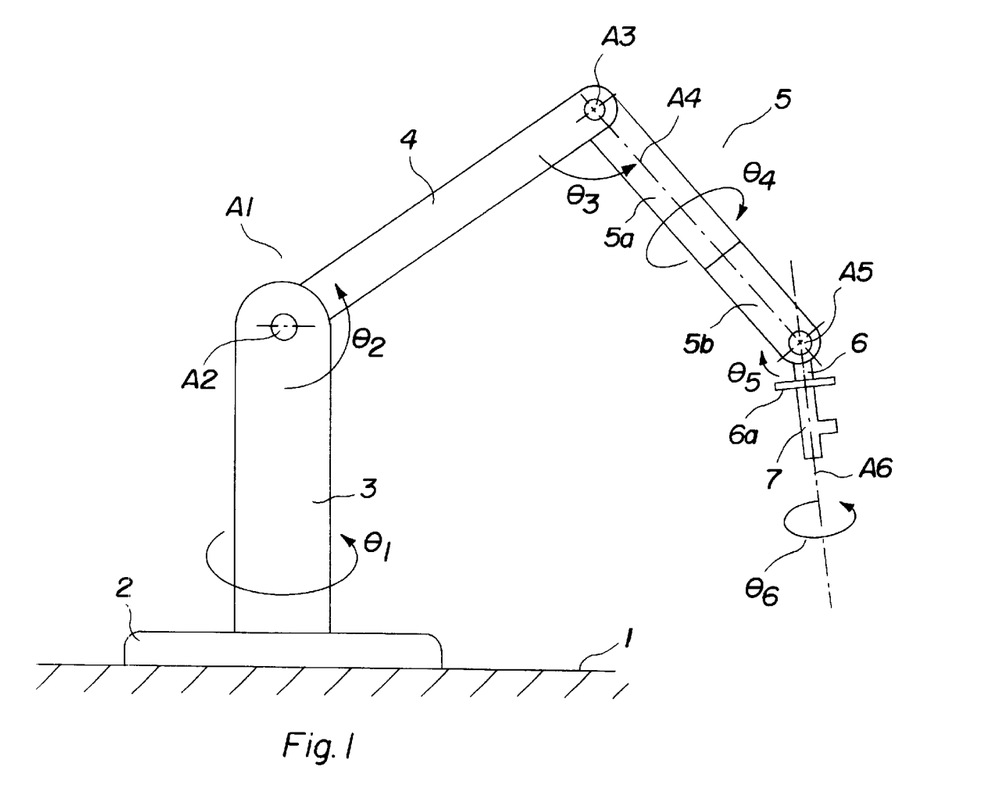
FIG. 1 schematically shows an industrial robot which can be calibrated with a method according to the invention.

FIG. 1 shows an example of a known industrial robot which may advantageously be calibrated with the method and the device according to the invention. On a base 1, the foot 2 of the robot is mounted. The robot has a first arm 3, which is rotatable in relation to the foot 2 around a vertical axis A1. At the upper end of the first arm, a second robot arm 4 is journalled and rotatable in relation to the first arm around a second axis A2. In the outer end of the second arm, a third arm 5 is journalled and rotatable in relation to the second arm around an axis A3. The third robot arm 5 comprises two parts 5*a* and 5*b*, the outer part 5*b* being rotatable in relation to the inner part 5*b* around an axis of rotation A4 coinciding with the longitudinal axis of the arm. At its outer end, the third arm 5 supports a fourth arm 6, which is rotatable around an axis of rotation A5 perpendicular to the longitudinal axis of the third arm. The outer part of the fourth arm consists of a tool attachment 6*a* which is rotatable in relation to the inner part of the fourth arm around an axis of rotation A6. The angles of rotation in the six axes of rotation A1 . . . A6 are designated θ1 . . . θ6 in the figure. On the tool attachment, a calibration tool 7 is mounted. The fourth arm and the tool attachment are referred to as the hand of the robot.

Figure 2:
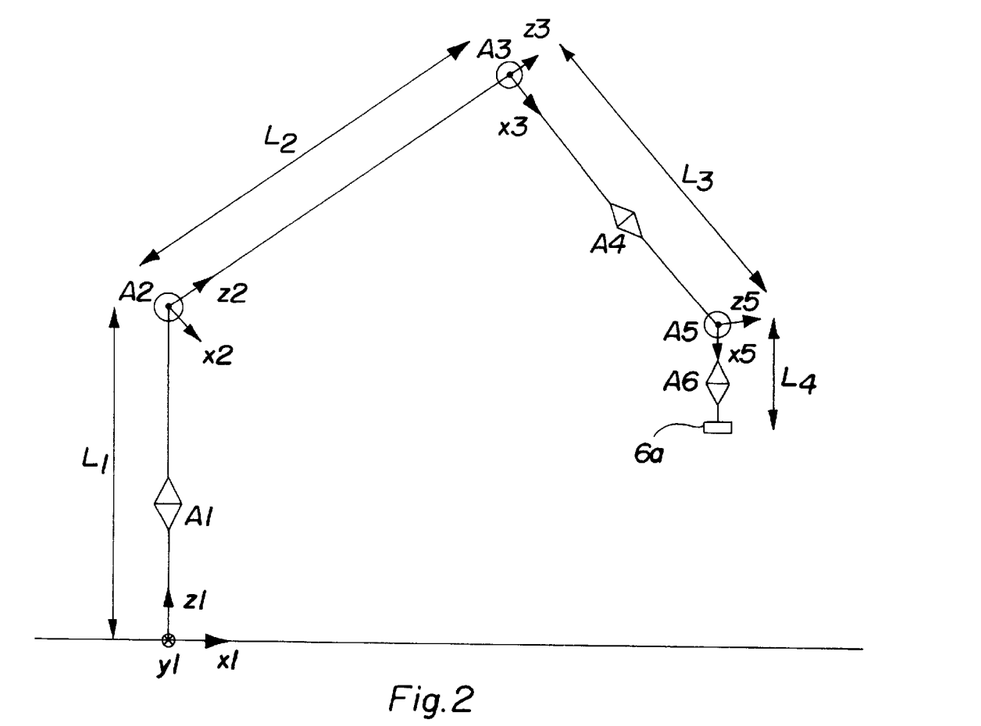
FIG. 2 shows the different coordinate systems of the robot.

FIG. 2 shows in the form of a simple sketch the kinematics of the six-axis robot in FIG. 1 and its associated coordinate systems. The robot has four current arm's lengths referred to as $L_1$, $L_2$, $L_3$, $L_4$, which means that there may be four arm's-length errors designated $\Delta L_1$, $\Delta L_2$, $\Delta L_3$, $\Delta L_4$. The nominal arm s lengths are designated $L_1^{nom}$, $L_2^{nom}$, $L_3^{nom}$, $L_4^{nom}$. The current arm's length constitutes the sum of the nominal arm's length and the arm's-length error. The first arm's length $L_1$ is the distance between the origin of coordinates in the so-called base coordinate system (see below) and the axis A2. The second arm's length $L_2$ is the distance between the axis A2 and the axis A3. The third arm's length $L_3$ is the distance between the axis A3 and the axis A5. The fourth arm's length $L_4$ is the distance between the axis A5 and the tool attachment 6*a*.

The robot foot comprises a base coordinate system (x1, y1, z1), which is an orthogonal coordinate system with the z1 axis coinciding with the axis of rotation A1 and with the x1 axis in a predetermined direction in relation to the robot foot (normally pointing straight ahead). Axis A1 has a synchronizing error $\Delta\theta 1$, two offset errors $O1_{x1}$, $O1_{y1}$, and two attitude errors $\phi 1_{x1}$, $\phi 1_{y1}$. Axis A2 is parallel to the y1 axis in the base coordinate system and has a synchronizing error $\Delta\theta 2$ and two attitude errors $\phi 2_{x1}$, $\phi 2_{z1}$. The attitude errors $\phi 2_{x1}$ and $\phi 2_{z1}$ are defined as those directional errors the axis A2 has in the x1 and z1 directions, respectively. The attitude error $\phi 2_{y1}$ is the same error as the synchronizing error $\Delta\theta 2$.

The intersection point between axis A1 and axis A2 constitutes the origin of coordinates in a second coordinate system (x2, y2, z2). The Z2 axis in the second coordinate system is parallel to the second robot arm, and the y2 axis coincides with the axis A2. The axis A3 has a synchronizing error $\Delta\theta 3$ and two attitude errors $\phi 3_{x2}$, $\phi 3_{z2}$. The axis A3 has an offset error in the x2 direction, but it is part of the synchronizing error of axis A2, that is $\Delta\theta 2$.

The intersection point between axis A3 and axis A4 constitutes the origin of coordinates in a third coordinate system (x3, y3, z3). The x3 axis in the third coordinate system coincides with the axis A4, and the y3 axis coincides with the axis A3. The axis A4 has a synchronizing error $\Delta\theta 4$, two offset errors $O4_{y1}$ and $O4_{z3}$ in relation to the axes A1 and A3, respectively, and two attitude errors $\phi 4_{y3}$, $\phi 4_{z3}$. The axis A5 has a synchronizing error $\Delta\theta 5$, two attitude errors $\phi 5_{x3}$, $\phi 5_{z3}$. The axis A5 has an offset error in the z3 direction, but it is part of the synchronizing error of axis A3, that is $\Delta\theta 3$.

The origin of coordinates in the fifth coordinate system (x5, y5, z5) consists of the intersection point between the axis A5 and the axis A6. The x5 axis in the third coordinate system coincides with the axis A6, and the y5 axis coincides with the axis A5. The axis A6 has a synchronizing error $\Delta\theta 6$, two offset errors $O6_{y5}$, $O6_{z5}$, and two attitude errors $\phi 6_{y5}$, $\phi 6_{z5}$. The attitude error $\phi 6_{z5}$ is part of the synchronizing error $\Delta\theta 5$. All the parameters are defined when the robot in FIG. 2 is in its so-called synchronizing position, that is, when the second arm is vertical and the third and fourth arms are horizontal.

Figure 3:
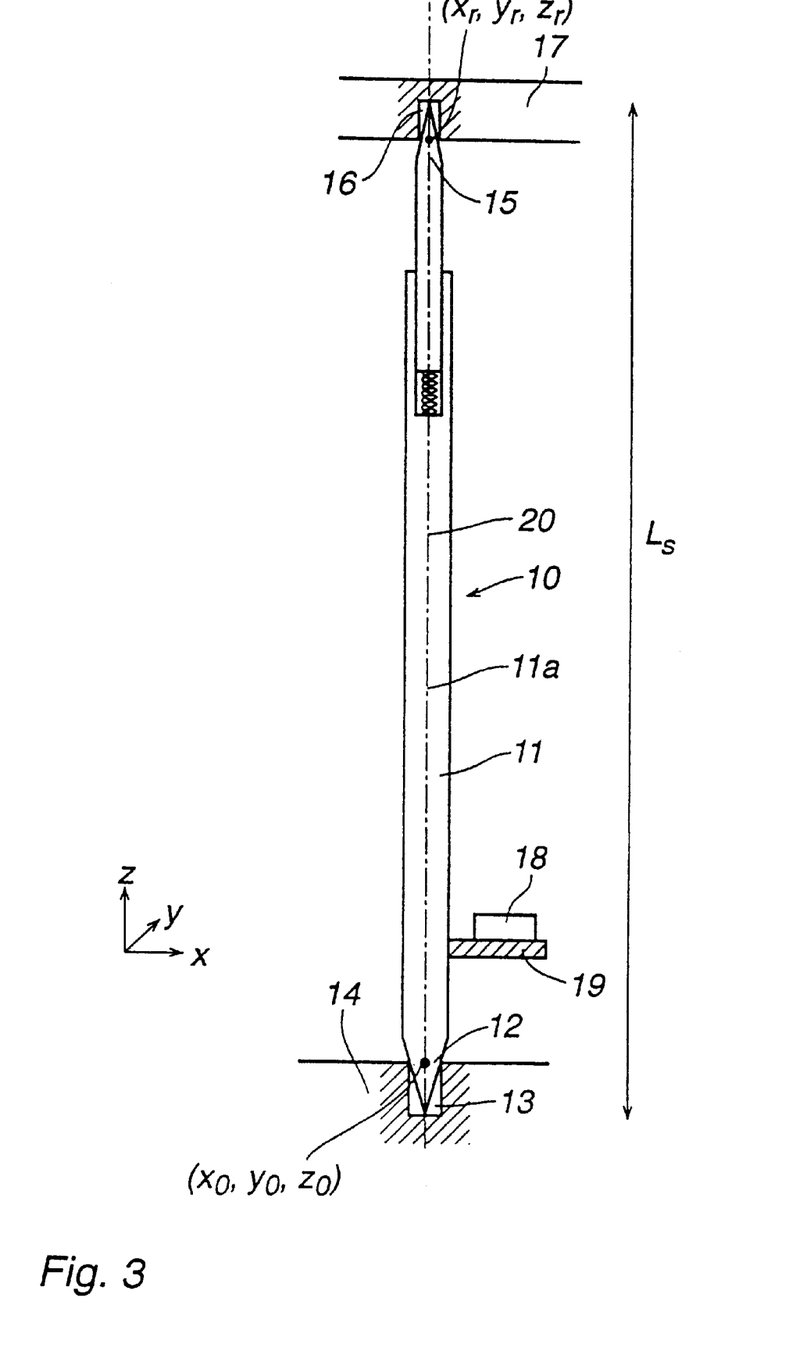
FIG. 3 schematically shows a simple embodiment of measuring equipment according to the invention which is suitable for use under active-service conditions.

FIG. 3 shows a simple embodiment of calibration equipment according to the invention. The calibration equipment comprises a measuring device 10 which in turn comprises a measuring rod 11, one end of which is formed as a tip 12 for connection to a reference point $(x_0, _0, z_0)$ in a first precision hole 13 in the robot foot or in the floor or the device 14 on which the robot foot is mounted. The other end of the measuring rod comprises a resilient measuring tip 15 for connection to a predetermined measuring point on the robot $(x_r, y_r, z_r)$ in a second precision hole 16, which is arranged in a robot arm or in a robot-carried calibration tool 17. The resilient measuring tip may alternatively include a position sensor for distance measurement in the z-direction. The measuring rod 11 has an axis of rotation 11*a* which intersects the reference point $(x_0, y_0, z_0)$ and the measuring point $(x_r, y_r, z_r)$. The measuring device 10 further comprises a gravity sensor 18 arranged on a sensor shelf 19, which is arranged on the measuring probe 11 and substantially perpendicularly and outwardly therefrom. The gravity sensor measures the angle between the gravity vector and a reference axis 20 which intersects the reference point $(x_0, y_0, z_0)$ and the measuring point $(x_r, y_r, z_r)$. The gravity sensor may, for example, be an electronic spirit level.

Figure 4A:
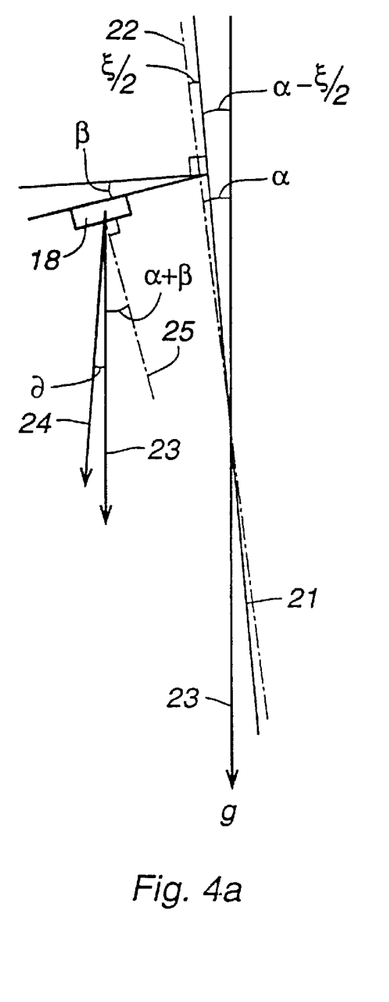
FIGS. 4a and 4b show the principle of how an axis of rotation is determined with a high precision by a gravity sensor.
Figure 4B:
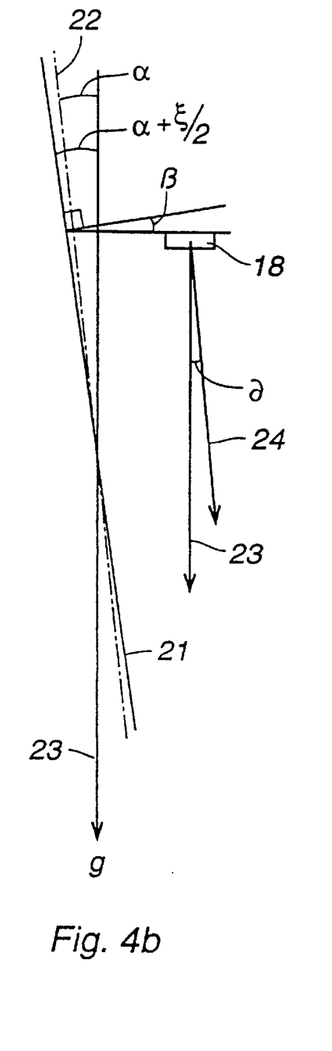

FIGS. 4*a* and 4*b* show the principle of how an axis of rotation 21 is determined with high precision by means of a gravity sensor 18. The angle α which is to be determined is the average direction 22 of the axis of rotation in relation to the direction 23 of the gravity force. This means that the axis of rotation 21 in FIG. 4*a* has the direction α−ξ/2, where ξ/2 is the spin amplitude when the sensor is rotated around the axis of rotation, and that the axis of rotation 21 in FIG. 4*b* has the direction α+ξ/2. A gravity sensor 18, with an offset error ∂ and with a mounting error β, is mounted so that the axis 25 of the gravity sensor, that is, its zero direction, is to be substantially parallel to the axis of rotation 21. Angles are indicated relative to the gravity vector with a positive clockwise angle. The angle of deflection 24 of the sensor is dependent, among other things, on the offset error ∂ and the mounting error β. The output signal of the sensor in FIG. 4*a* is given by the difference between the direction of deflection 24 and the zero direction 25:

$$u_{s1}=K_s(-\alpha+\xi/2-\beta-\partial) \quad (1)$$

$K_s$ is the sensitivity of the sensor.

In FIG. 4b the sensor is rotated 180° around the axis of rotation 22. The output signal of the sensor is then:

$$u_{s2}=K_s(\alpha+\xi/2-\beta-\partial) \quad (2)$$

$$(u_{s2}-u_{s1})/2=K_s\cdot\alpha \quad (3)$$

The difference between the deflections of the sensor for the two measurements is thus proportional to the average direction $\alpha$ of the axis of rotation in relation to the direction of the force of gravity. Thus, neither the mounting error $\beta$ nor the offset angle $\partial$ of the sensor will influence the measurement result, and therefore the sensor may be mounted in a simple way and a sensor without absolute calibration can be used. In addition, any centering errors $\xi$ which give rise to spin of the axis of rotation will be compensated for.

The measuring device in FIG. 3 may, for example, be used to determine the coordinates for the measuring point $(x_r, y_r, y_r)$. The measuring device is connected to the two precision holes 13 and 16 and are then rotated three times one-fourth of a revolution, whereby the gravity sensor is read at the angles 0, $\pi/2$, $\pi$ and $3\pi/2$. The corresponding sensor deflections are $u_{s0}$, $u_{s\pi/2}$, $u_{s\pi}$ and $u_{s3\pi/2}$, and with the aid of these values, the inclination of the measuring rod in the x- and y-directions can be calculated according to:

$$\alpha_x=(u_{s0}-u_{s\pi})/2Ks \quad (4)$$

$$\alpha_y=(u_{s\pi/2}-u_{s3\pi/2})/2Ks \quad (5)$$

If the length of the measuring probe is $L_s$ the coordinates of the measuring point, $(x_r, y_r)$, can be calculated according to:

$$x_r=x_0+L_s\cdot\sin(\alpha_x) \quad (6)$$

$$y_r=y_0+L_s\cdot\sin(\alpha_y) \quad (7)$$

This simple embodiment of the measuring device is suitable for calibration under active-service conditions, whereby the measuring device is rotated around manually or by the axis A6 of the robot driving it around. To use the measuring device in FIG. 3 in an automatic calibration method, a simple motor may be used to rotate the sensor to the four different angles. The robot must also be able to release the measuring probe to measure the position at different z coordinates along the measuring device and against different measuring points of the robot.

Figures 5A, 5D:
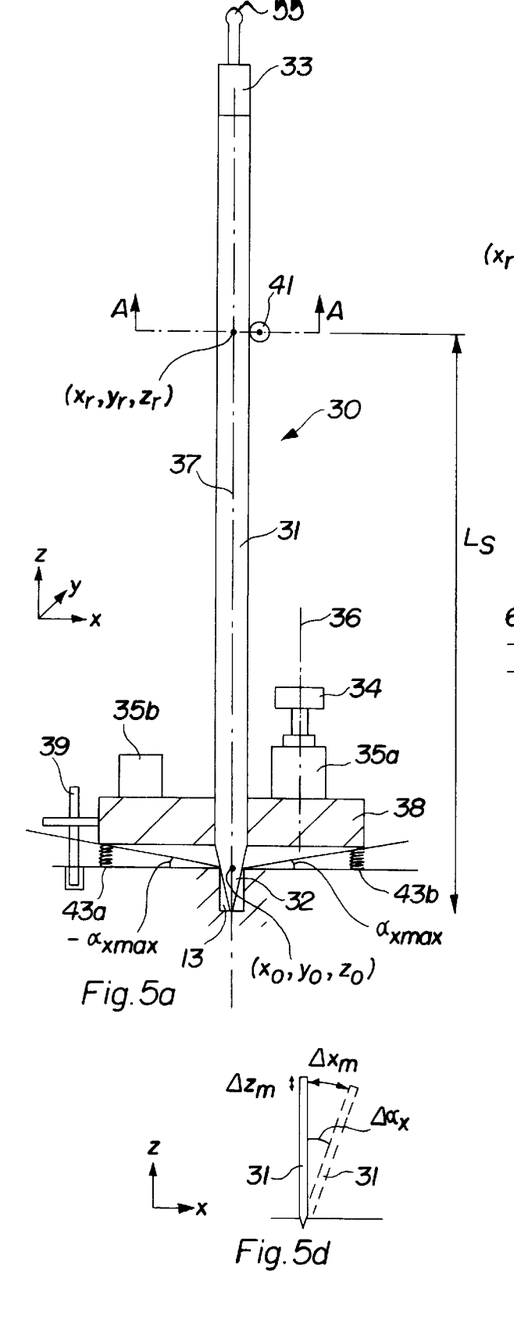
Figure 5B:
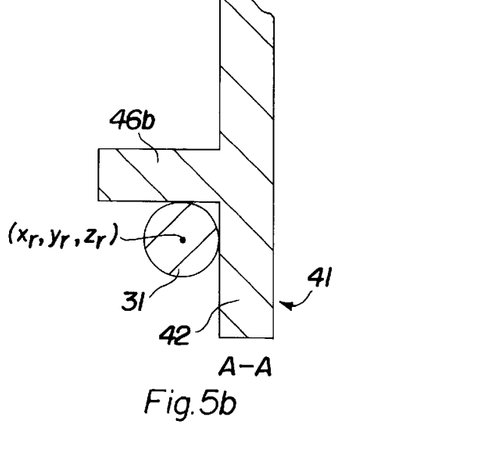

FIG. 5a shows an example of how a separate measuring device 30, with an associated calibration tool 41 suitable for automatic calibration, may be designed. FIG. 5b shows the measuring device and the calibration tool in a section A—A in FIG. 5a. The measuring device 30 comprises a cylindrical measuring rod 31, one end of which is designed as a point 32 for connection to a reference point $(x_0, y_0, z_0)$ in the robot foot or on the workshop floor 40, and the other end of which comprises a position sensor 33 for measuring the distance to the reference point in the z-direction. In that end of the measuring rod which is connected to the reference point, a balance weight 38, in the form of a circular disc, is arranged for balancing the measuring rod. To give the measuring device a vertical position of rest, a number of springs 43a, 43b are mounted between the balance weight and the base 40. The angle $\alpha_{xmax}$ determines the limit of the working range for $\alpha_x$.

The measuring device 30 further comprises a gravity sensor 34 and a motor 35a, for example a stepping motor, adapted to rotate the gravity sensor around its axis 36 and a counterweight 35b to the motor 35a. The axis of rotation 36 of the gravity sensor is measured in relation to the axis of rotation 37 of the measuring rod by rotating the measuring rod. It is sufficient to do this once. The gravity sensor 34, the motor 35a and its counterweight 35b are arranged on the balance weight 38. To define the x-axis direction, a guide pin 39 is arranged in the robot foot or on the workshop floor 40. During the calibration, the robot is in contact with the measuring rod via a calibration tool 41.

Figure 5C:
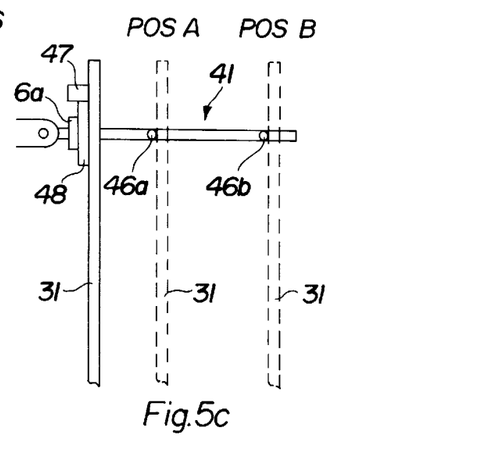

FIG. 5c shows the calibration tool viewed from the side. The calibration tool comprises a cylindrical rod 41 on which two cylindrical branches 46a and 46b are arranged perpendicular to the rod 41. The two branches make possible measurement with the measuring device 30 in two different positions, POS A and POS B. The measuring device 30 is provided with a hook 47 which may be hooked onto a slotted holder 48 which is arranged on the calibration tool. By hooking the measuring device onto the calibration tool, the measuring device may be lifted out of the precision hole 13. The measuring device may need to be lifted out both when moving between different precision holes, and when measuring directions of axes of the robot.

If the distance $L_s$ between the reference point $(x_0, 0, z_0)$ and a measuring point $(x_r, y_r, z_r)$ on the calibration tool is known, see FIG. 5a, $x_r$ and $y_r$ for the measuring point may be determined with the following method:

running the measuring device and the calibration tool into contact with each other, rotating the gravity sensor three-fourths of a revolution and reading it at the angles 0, $\pi/2$, $\pi$, $3\pi/2$. The corresponding sensor deflections are $u_{s0}$, $u_{s\pi/2}$, $u_{s\pi}$ and $u_{s3\pi/2}$, calculating the inclination of the measuring rod in the x-and y-directions $(\alpha_x, \alpha_y)$ according to equations 4 and 5, calculating the coordinates $(x_r, y_r)$ of the measuring point according to equations 6 and 7.

The difference in the position of the measuring point between two different measurements is obtained at small angular differences $\Delta\alpha_x$, $\Delta\alpha_y$:

$$\Delta x_m=L_s\cdot\Delta\alpha_x \quad (8)$$

$$\Delta y_m=L_s\cdot\Delta\alpha_y \quad (9)$$

$\Delta x_m$: The movement of the measuring rod in the x direction, (see FIG. 5d)

$\Delta y_m$: The movement of the measuring rod in the y direction.

This embodiment of the calibration equipment can be directly used in order to automatically calibrate, in one sequence, the axes of rotation A1–A6 with respect to the synchronizing error, and to measure most of the kinematic error parameters of the robot.

Instead of using one rotating gravity sensor, two gravity sensors may be arranged perpendicular to each other. These are calibrated by rotation of the measuring rod. Whether one rotating or two perpendicular gravity sensors are used is determined by the sensor price and by the long-term stability of the offset error $\partial$.

Figure 5E:
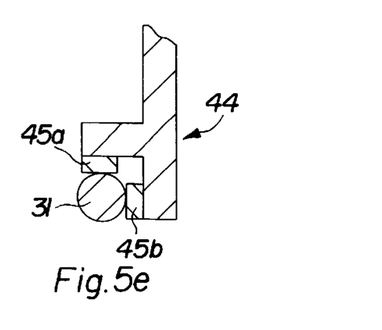
FIG. 5e shows an embodiment of a calibration tool according to the invention.

To obtain a reliable contact between the measuring rod and the calibration tool, the calibration tool may be provided with magnets, preferably electromagnets. FIG. 5e shows a calibration tool 44 provided with two magnets 45a and 45b.

Figure 6A:
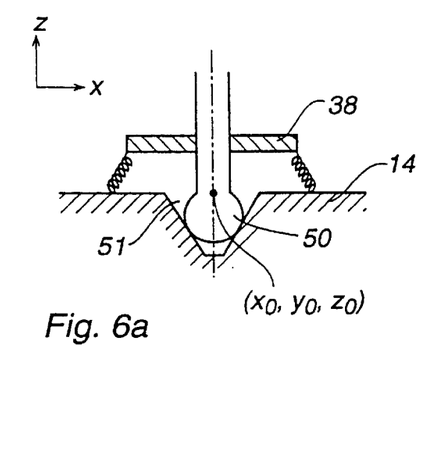
FIGS. 6a and 6b show alternative embodiments of means for connection to a reference point.
Figure 6B:
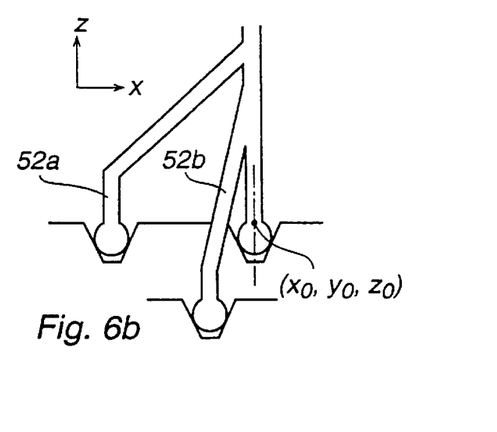

FIGS. 6a and 6b show alternative embodiments of means for connection to the reference point $(x_0, y_0, z_0)$. FIG. 6a shows a connection means in the form of a sphere 50 which is inserted into a conically shaped precision hole 51 in the workshop floor 14. An advantage with a sphere compared with a point is that the sphere gives the measuring device a larger working range. Instead of a balance weight and springs, the measuring device shown in FIG. 6b is provided with two supporting legs 52a, 52b to balance the measuring device. Each of the supporting legs terminates with a spherical body which is inserted into respective conical holes in the floor.

Figure 7A:
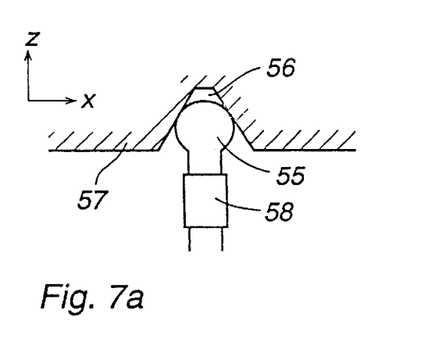
FIG. 7a shows an embodiment of a member adapted to be in contact with the robot during the calibration method.
Figure 7B:
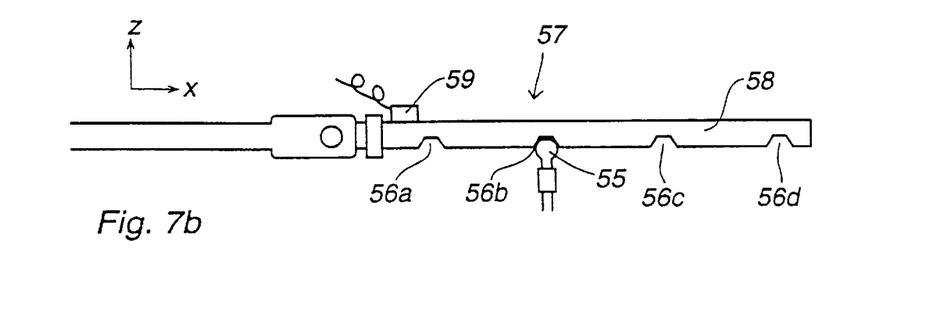
FIG. 7b shows a further embodiment of a calibration tool according to the invention.

FIG. 7a shows an embodiment of a means adapted to be in contact with the robot during the calibration process, wherein the means is formed as a sphere 55 which will be referred to in the following as a measuring ball. During the calibration process, the measuring ball is in contact with a conically shaped hole 56 in the robot or a calibration tool 57. For distance measurements in the z-direction, a position sensor 58 is arranged below the measuring ball. FIG. 7b shows an example of a calibration tool 57 adapted to be used in combination with the measuring ball 55. The calibration tool comprises a rod 58 with a plurality of conical holes, 56a, 56b, 56c, 56d, arranged in spaced relationship to each other.

To reduce the number of necessary measurements when determining the kinematic error parameters of the robot, the calibration tool may be provided with a gravity sensor 59, whereby both the working point (TCP) of the tool and the inclination in the xz-plane may be measured with high accuracy.

If the measuring device comprises more than one measuring ball with an associated position sensor, a large working range may be obtained for measuring the error parameters of the robot.

By making the measuring device in telescopic design and measuring the compression of the telescope with, for example, a resolver arrangement, the measuring range in the z-direction may be greatly extended.

Figures 8, 8C:
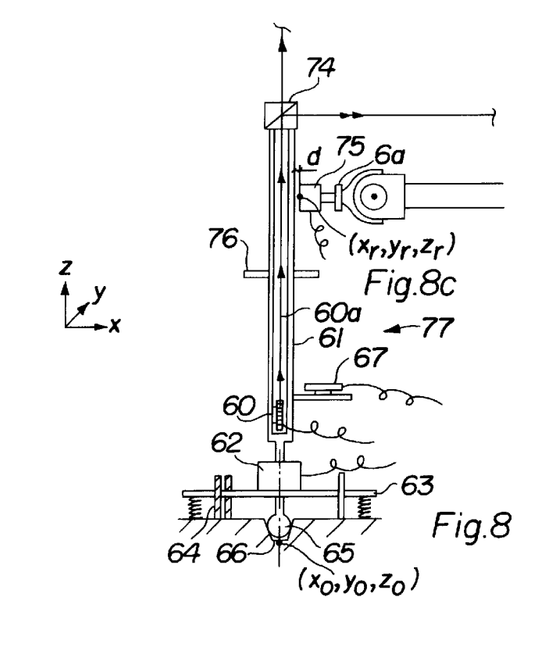
FIG. 8 shows a measuring device and FIGS. 8a and 8b show alternative locations and embodiments of a calibration tool for optical measurement.
FIG. 8c shows an embodiment of measuring equipment with a non-contacting, non-optical sensor.

A further extension of the measuring range is obtained with a measuring device 77 comprising an optical measuring system, whereby either the measuring device is provided with a light source and the robot-carried tool is provided with light detectors or vice versa. FIG. 8 shows the case where a light source 60, suitably a laser diode, is mounted in a cylindrical and hollow measuring rod 61. The measuring rod 61 may be rotated by a motor 62, which is arranged on a platform 63, balanced by springs, with guide pins 64 and a precision ball 65 in a conical precision hole 66 in the workshop floor. On the measuring rod 61, a gravity sensor 67 is mounted, and when the motor 62 rotates around the measuring rod 61, the gravity sensor measures the direction 60a of the axis of rotation relative to the direction of gravity. At the same time the axis of rotation 60a is the axis around which the light beam from the laser diode will move. If the light beam hits a lateral photodetector, for example a lateral photodiode or photomatrix, the illuminated spot on the detector will move in a circular path on the surface of the detector. The center of this path will thus be the point of intersection of the axis of rotation with the surface of the detector.

Figure 8A:
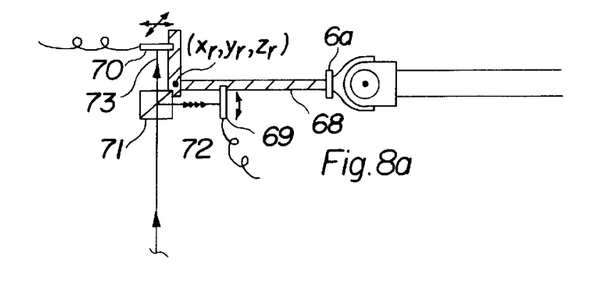
Figure 8B:
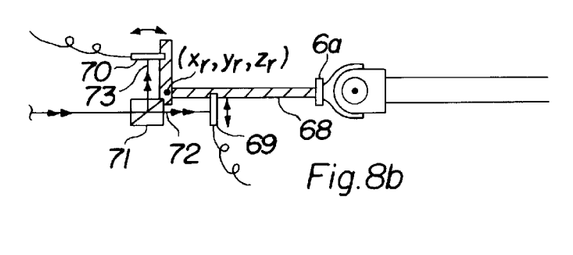

FIGS. 8a and 8b show how the robot-carried calibration tool 68 is provided with two lateral photodetectors 69 and 70, which are mounted perpendicular to each other to capture the two light beams 72 and 73 from a beamsplitter 71. When the calibration tool is placed straight above the measuring rod 61, as shown in FIG. 8a, the detector 70 will read the position of the tool in the x- and z-directions whereas the detector 69 reads the orientation of the tool in the xz plane. If a beamsplitter 74 is mounted at the orifice of the measuring rod 61, possibilities of making measurements perpendicular to the axis of rotation of the measuring rod are obtained. Thus, according to FIG. 8b, the two detectors 69 and 70 measure the position in the z-direction, whereas the detector 70 may also be used for measuring the tool orientation in the xz plane.

FIG. 8c shows how an electromagnetic sensor 75, which may be capacitive or inductive, measures the position of the measuring point $(x_r, y_r)$ in the xy-plane relative to the cylindrical surface of the measuring rod 61. The cylindrical surface may, where necessary, consist of plane grinding surfaces. By placing collars 76 on the measuring rod, the sensor can also measure the position of the measuring point in the z-direction, that is, $z_r$. In addition to electromagnetic sensors, mechanical or ultrasonic sensors can be used.

Figure 9:
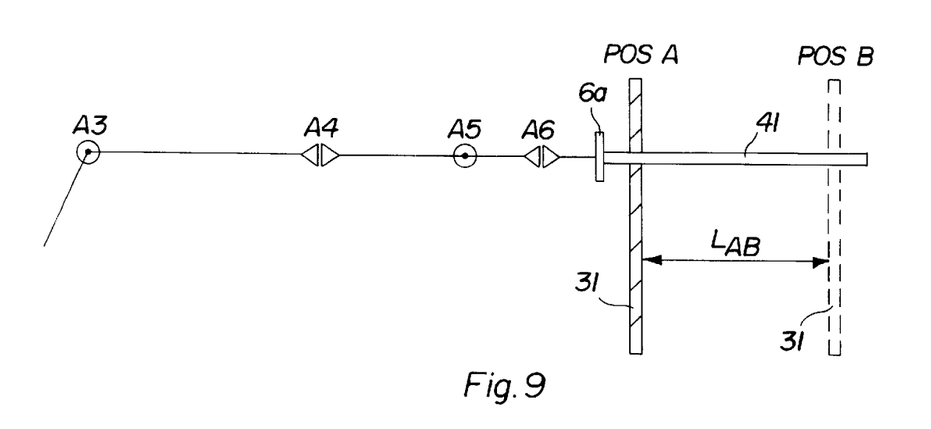
FIG. 9 shows how the measuring device and the calibration tool in FIG. 5a are arranged for measuring the synchronizing error of axis A5, and the attitude and offset errors of axis A6 in relation to axis A4.

FIG. 9 shows how the measuring device and the calibration tool in FIG. 5a are arranged for measuring the synchronizing error $\Delta\theta5$ of the axis A5 as well as the attitude error $\phi6_{y5}$ and the offset errors $O6_{y5}$ of axis A6 relative to axis A4. The configuration of the robot is chosen so that axis A4 and axis A6 are horizontal. The calibration tool 41 is mounted on the tool attachment 6a of the robot in such a way that the calibration tool 41 becomes centered in the average direction of rotation of the axis A6. The robot is run so that the calibration tool 41 makes mechanical contact with the measuring rod 31. The measurements are carried out with the calibration tool or the robot axis A2 in two positions, POS A and POS B. In POS A, contact is achieved between the measuring rod and that part of the calibration tool which is nearest the tool attachment, and in POS B contact is achieved between the measuring rod and the outer part of the calibration tool. The distance between the measuring rod in position A and in position B is $L_{AB}$. The following measurement sequence is carried out:

a) With the calibration tool (or robot) in position according to POS A, axis A6 is rotated three-fourths of a revolution and the gravity sensor is read at the angles $\theta6=0, \pi/2, \pi, 3\pi/2$ for axis A6. The robot thus assumes four different configurations at which the gravity sensor is read.

b) With the calibration tool in position according to POS A, axis A4 is rotated at least three-fourths of a revolution and the gravity sensor is read at the angles $\theta4=0, \pi/2, \pi, 3\pi/2$ for axis A4. The robot thus assumes an additional four different configurations at which the gravity sensor is read.

c) Repeat point a above with the calibration tool in position according to POS B.

d) Repeat point b above with the calibration tool in position according to POS B.

Figure 10A:
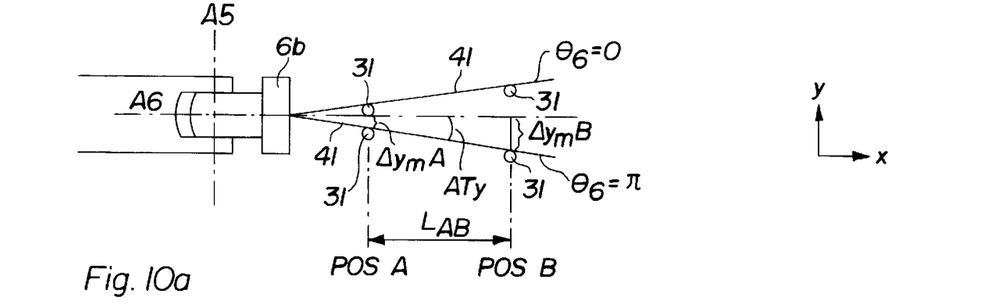
FIG. 10a shows how the attitude error of the calibration tool in the y-direction is calculated.

From the readings from point a and point c, the offset errors, $OT_y$, $OT_z$, and the attitude errors $AT_y$, $AT_z$, of the calibration tool relative to axis A6 are calculated, both in the y- and z-directions. FIG. 10a shows how the attitude errors of the calibration tool in the y-direction are calculated. The average movement in the y-direction in positions A and B is calculated according to the following:

$$\Delta y_m A=(y_m A(\theta6=0)-y_m A(\theta6=\pi))/2 \quad (10)$$

$$\Delta y_m B=(y_m B(\theta6=0)-y_m B(\theta6=\pi))/2 \quad (11)$$

$y_m B$=The position of the measuring rod in the y-direction when measuring in POS B.

$y_m A$=The position of the measuring rod in the y-direction when measuring in POS A.

$$AT_y=(\Delta y_m B-\Delta y_m A)/L_{AB} \quad (12)$$

Figure 10B:
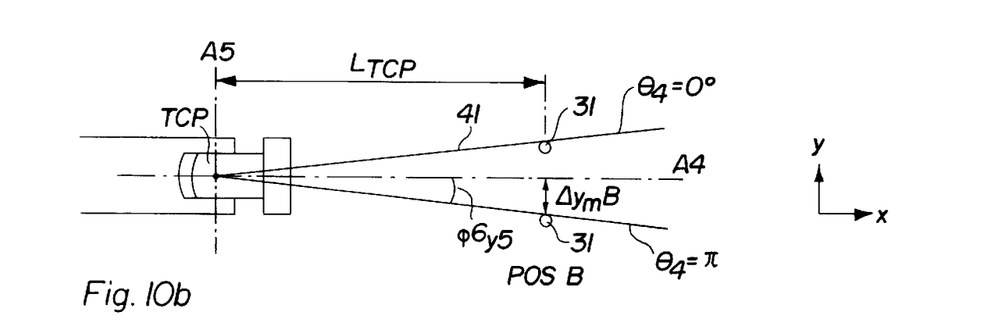
FIG. 10b shows how the attitude error of axis A6 in the y-direction is calculated.

From the readings from point b and point d, the offset errors for axis A6 relative to axis A4, and the attitude errors for axis A6 relative to axis A4 are calculated. FIG. 10b shows how the attitude error $\phi 6_{y5}$ for axis A6 in the y-direction is calculated. The distance between the center point of the tool, TCP (Tool Center Point), and position B is designated $L_{TCP}$. The movement of the measuring rod in the y-direction when measuring in position B, $\Delta y_m B$, is calculated according to the following:

$$\Delta y_m B = (y_m B(\theta_4=0) - y_m B(\theta_4=\pi))/2 \qquad (13)$$

The attitude error of axis A6 in the y-direction relative to axis A4, $\phi 6_{y5}$, is calculated according to the following equation:

$$\phi 6_{y5} = \Delta y_m B / L_{TCP} \qquad (14)$$

Figure 10C:
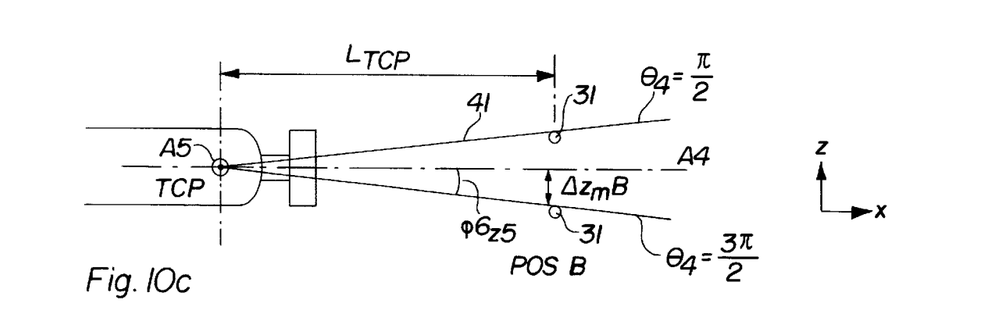
FIG. 10c shows how the synchronizing error of axis A5 is calculated.

FIG. 10c shows how the synchronizing error $\Delta\theta 5$ of axis A5 may be calculated. The synchronizing error $\Delta\theta 5$ of axis A5 is identical with the attitude error in the z-direction for axis A6, $\phi 5_{z5}$.

$$\Delta z_m B = (z_m B(\theta_4=\pi/2) - y_m B(\theta_4=3\pi/2))/2 \qquad (15)$$

$$\Delta\theta 5 = \phi 6_{z5} = \Delta z_m B / L_{TCP} \qquad (16)$$

Figure 10D:
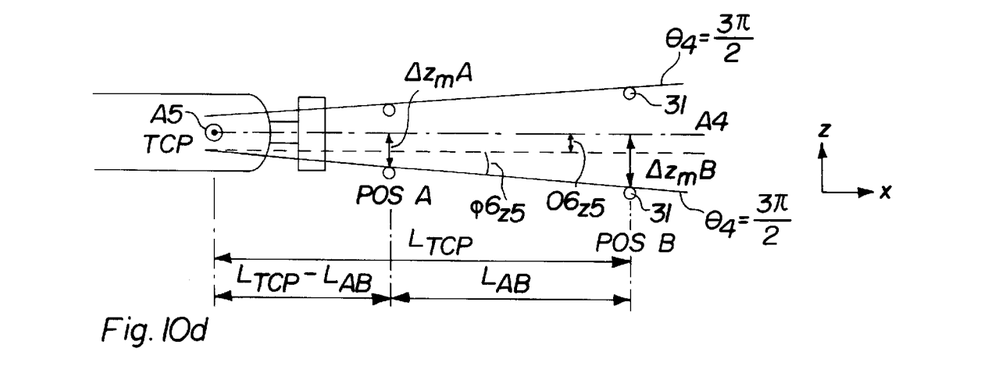
FIG. 10*d* shows how the offset error of axis A6 in relation to axis A4 in the z-direction is calculated.

FIG. 10d shows how the offset error $O6_{z5}$ of axis A6 relative to axis A4 in the z-direction can be calculated. The following relationship may be set up:

$$\phi 6_{z5} = (\Delta z_m A - O6_{z5})/(L_{TCP} - L_{AB}) = (\Delta z_m B - O6_{z5})/L_{TCP} \qquad (17)$$

From this equation, the offset error $O6_{z5}$ may be solved:

$$O6_{z5} = \Delta z_m A \cdot L_{TCP}/L_{AB} - \Delta z_m B \cdot (L_{TCP} - L_{AB})/L_{AB} \qquad (18)$$

In the above-mentioned calculations, the errors of the calibration tool have already been compensated for. The same principle may be used for measuring the offset errors between axis A1 and axis A4.

Figure 11A:
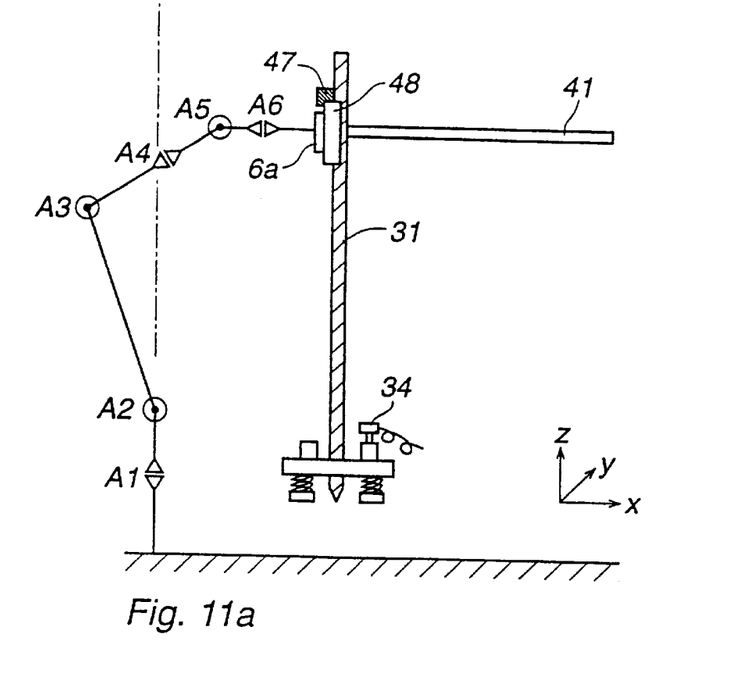
FIGS. 11*a* and 11*b* show a measurement arrangement for measuring the attitude error of axis A1 in relation to the gravitational direction and the synchronizing error of axes A3–A6.
Figure 11B:
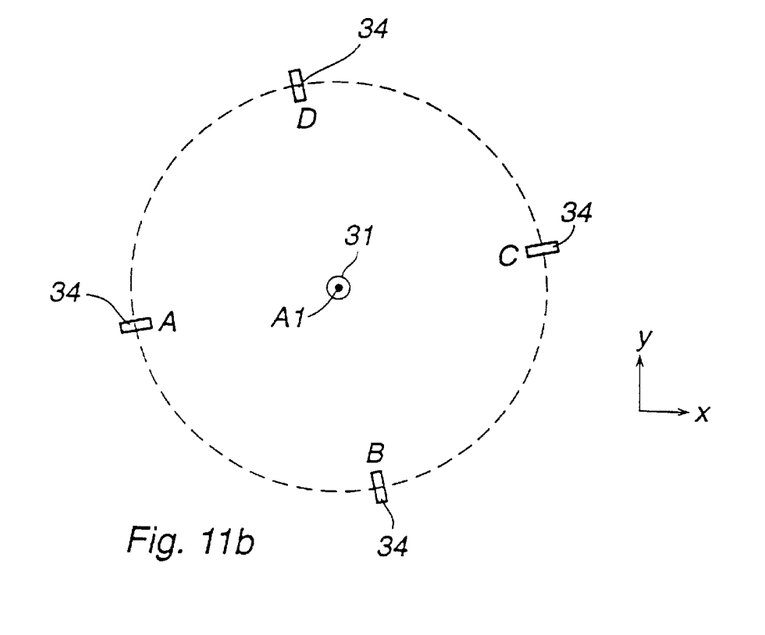

FIGS. 11a and 11b show how the attitude errors $\phi 1_{x1}$, $\phi 1_{y1}$ of axis A1 relative to the direction of gravitation are measured. $\phi 1_{x1} = \alpha_x$ and $\phi 1_{y1} = \alpha_y$, see FIGS. 4a and 4b, and is calculated according to equations 4 and 5. In this embodiment, the robot holds the measuring rod 31 by hooking the rod onto the calibration tool 41 with the aid of the hook 47 which is placed across the holder 48 on the calibration tool. The measuring device, which is fixed to the calibration tool, is suspended somewhat above the shop floor. FIG. 11b shows a simplified sketch of FIG. 11a viewed from above. The robot is then run to four different configurations (A, B, C, D according to FIG. 11b) at which the gravity sensor is read. The four configurations differ only in that the angle of axis A1 is different. The measured values thus obtained from the gravity sensor then provide the attitude errors of axis A1 relative to the direction of gravity. The measured values in positions A and B give $\phi 1_{x1}$, and the measured values in positions B and D give $\phi 1_{y1}$. The same principle may be used for determining the synchronizing error of axes A3–A6.

Figure 12A:
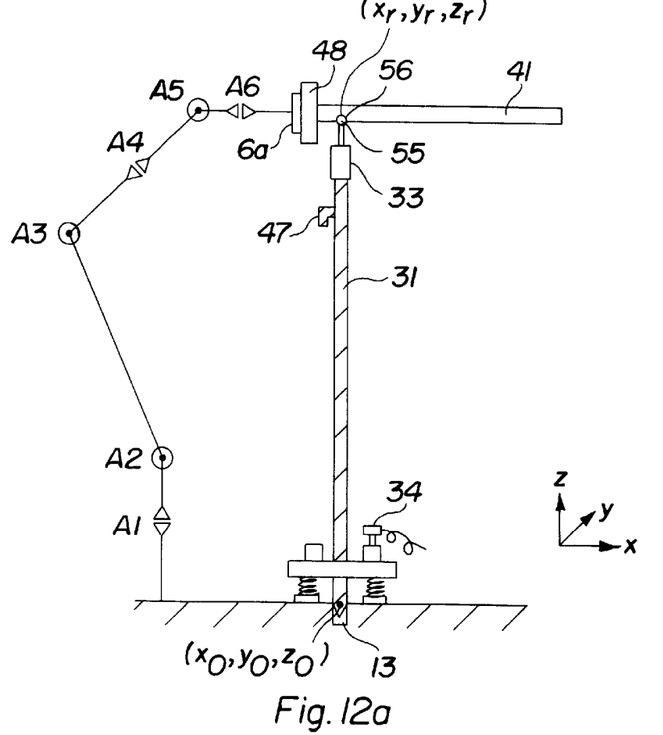
FIGS. 12*a* and 12*b* show a measurement arrangement for measuring the attitude error and offset error of axis A1 in relation to the workshop floor and the synchronizing error of axes A1, A2 and A3.
Figure 12B:
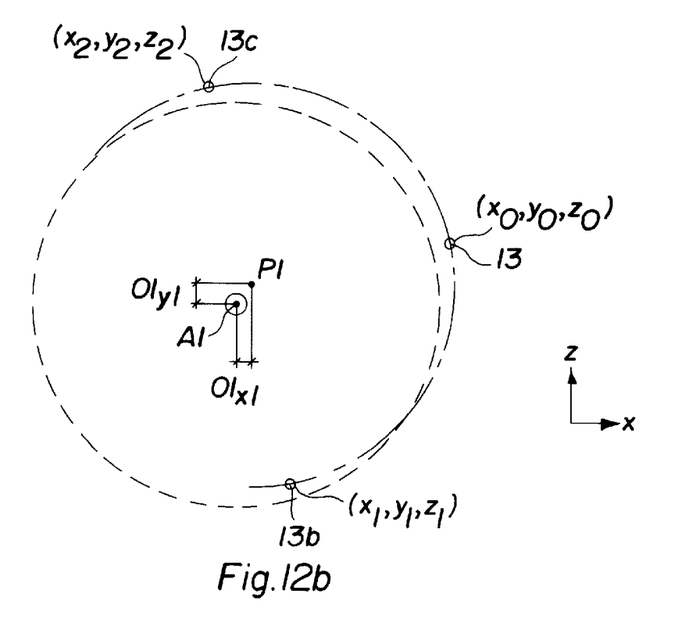

In FIG. 12a the measuring rod 31 has been placed in the hole 13 and a hole 56 in the calibration tool has been positioned across the measuring ball 55 which is mounted on the position sensor 33. For a given robot configuration, that is, for given angles of the axes of rotation A1–A6, the position $(x_r, y_r, z_r)$ of the measuring point is determined. In the z-direction the position is measured by means of the position sensor 33. In the x- and y-directions, the position is calculated by means of the equations 4, 5, 6 and 7 using output signals read from the gravity sensor 34. If the attitude errors and the offset errors of axis A1 relative to the workshop floor are desired, three precision holes 13, 13b and 13c with separate reference points $(x_0, y_0, z_0)$, $(x_1, y_1, z_1)$ and $(x_2, y_2, z_2)$ may be arranged in the floor according to FIG. 12b. The robot then inserts the measuring rod 31 into these recision holes and at each precision hole, measurements of the position of the measuring point are performed according to the above. During the measurements in the holes 13, 13b and 13c, the robot is to have the same axial angles for axes A2–A6, that is, only axis A1 has different values of the axial angles. From the differences between the measured values in the z-direction for holes 13, 13b and 13c, the attitude errors in the x- and y-directions for axis A1 relative to the floor shop are calculated. From the position determinations in the x- and y-directions for holes 13, 13b and 13c, the offsets in the x-direction ($01_{x1}$) and in the y-direction ($01_{y1}$) of axis A1 relative to the nominal position (P1) for axis A1 are calculated.

The synchronizing errors of axes A1, A2 and A3 are measured with the same arrangement as in FIG. 12a. The hole 13 is measured so as to constitute the zero position for the position sensors of axis A1 and axis A2. The length of the measuring rod corresponds to the zero position of the position sensor of axis A3. The synchronizing error of axis A1, $\Delta\theta 1$ is given by the inclination of the measuring rod in the y-direction. In order to directly separate the synchronizing errors of axis A2, $\Delta\theta 2$ from the synchronizing error in axis A3, $\Delta\theta 3$, axes A2 and A3 should be in synchronizing position during the measurement (the second arm 4 vertical and the third arm 5 horizontal). If this is the case, the inclination of the measuring rod in the x-direction will provide the synchronizing error of axis A2 whereas the value in the z-direction read by the sensor 34 gives the synchronizing error of axis A3.

$$\Delta\theta 1 = \Delta y_m/(L_{TCP}+L3) \qquad (19)$$

$$\Delta\theta 2 = \Delta x_m/L2 \qquad (20)$$

$$\Delta\theta 3 = \Delta z_m/(L_{TCP}+L3) \qquad (21)$$

When the direction of axis A1 is known in relation to the direction of gravity (FIG. 11), the attitude error $\phi 2_{z1}$ and $\phi 3_{z2}$ of axes A2 and A3 may be determined as the deviation from 90° between axis A2 and axis A1 and between axis A3 and axis A1, respectively.

Figure 13:
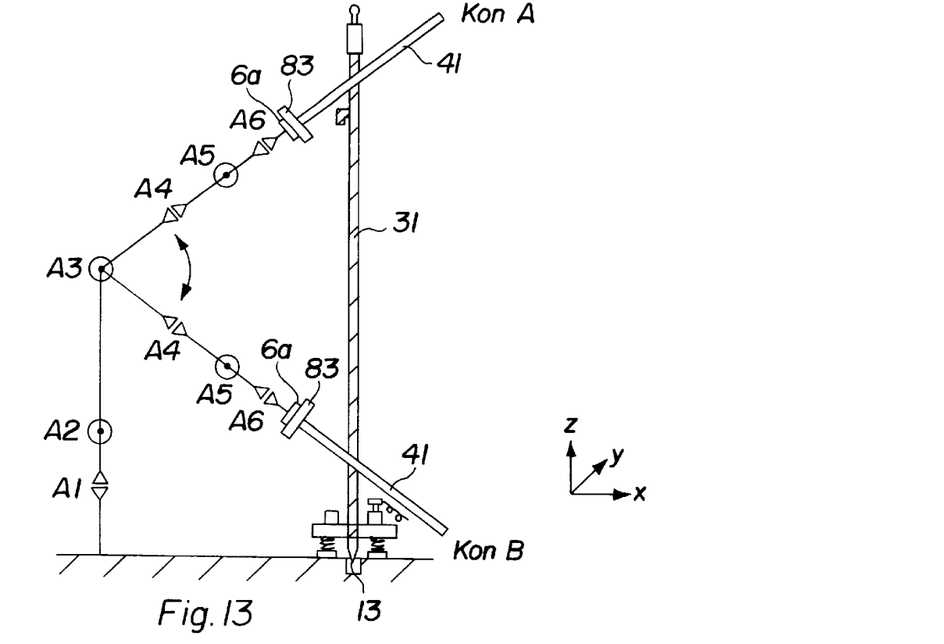
FIGS. 13 and 14 show a measurement arrangement for measuring attitude errors in axis A3.
Figure 14:
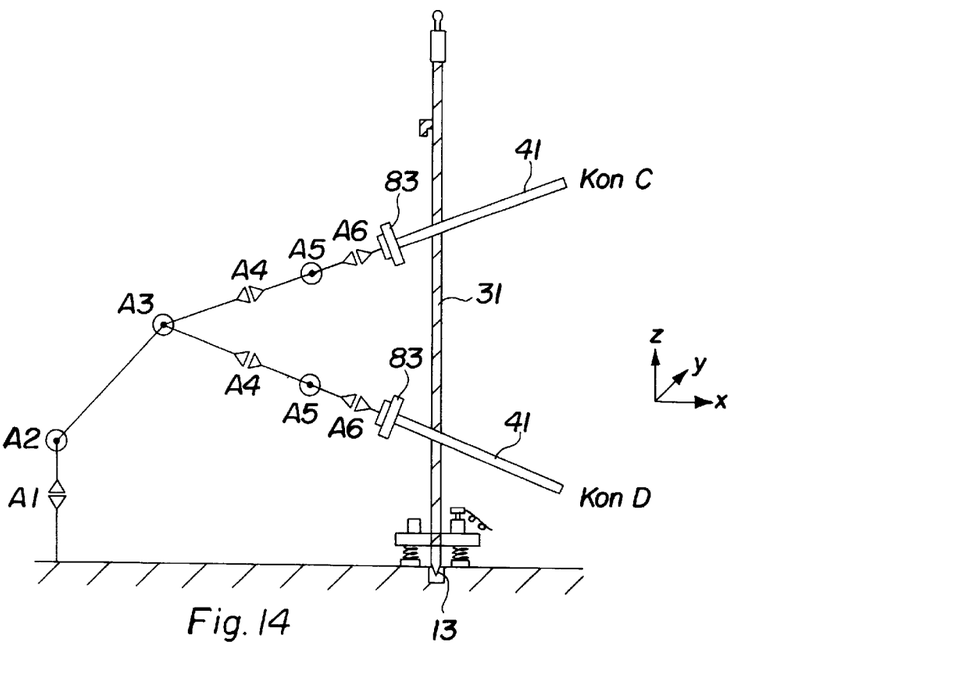

In FIG. 13, the attitude error $\phi 3_{z2}$ of axis A3 is measured by recording the inclination of the measuring rod in the y-direction at two different robot configurations, Kon A and Kon B, which have the same axial angles for axes A1, A2, A4–A6, that is, only axis A3 has different values of the axial angles. To measure the attitude error in the x-direction, $\phi 3_{x2}$, the axis A2 is rotated so that also the attitude error in the x-direction gives rise to detectable differences in inclination of the measuring rod (see FIG. 14). The attitude error $\phi 3_{x2}$ is calculated from the difference in measured attitude error between the measurements in FIG. 14 and FIG. 13. The measured attitude errors apply relative to the direction of gravity and are therefore re-calculated to apply relative to the direction of axis A1 with knowledge of the direction of axis A1 relative to the direction of gravity, which is measured according to FIG. 11.

Figure 15:
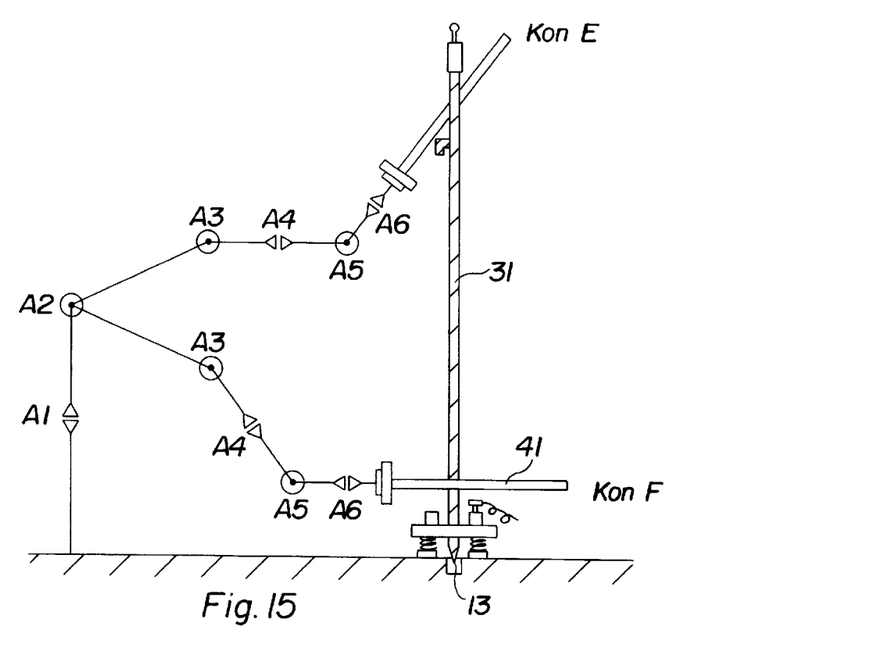
FIG. 15 shows a measuring arrangement for measuring attitude errors in axis A2.

The attitude error of axis A2 in the z-direction, $\phi 2_{z1}$, is measured in a corresponding way (see FIG. 15). Measurements are carried out for two different robot configurations, Kon E and Kon F, which have the same axial angles for axes A1, A3–A6, that is, only axis A2 has different values of the axial angles. The attitude errors of axis A2 in the x-direction are normally compensated for during the synchronization of axis A1, unless the robot has a design with a large offset between axis A1 and axis A2.

Transmission errors caused by errors in the parallelogram transmission between the motor of axis A3 and the second robot arm 4 are measured in the simplest way when the measuring rod 31 is hooked onto the calibration tool according to FIG. 11a. The inclination of the measuring rod in the x-direction for different angles of axis A2 and axis A3 is then measured with the sensor 34. From these measurements, a table is then calculated which denotes the transmission error for different angular values of axis A2 and axis A3.

Figure 16:
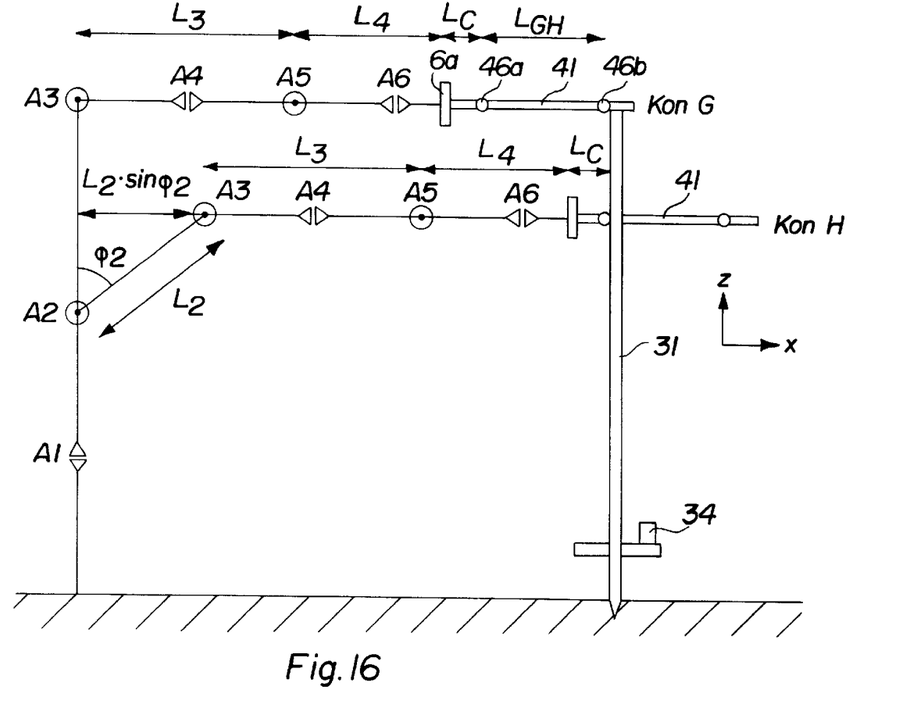
FIG. 16 shows a measurement arrangement for measuring arm's length errors.

FIG. 16 shows a method of measuring and identifying the arm's length error of the second robot arm 4. The measurements are carried out in two different robot configurations, Kon G and Kon H. The configurations are chosen such that axis A4 and axis A6 are horizontal. Axis A2 is then run to two positions in which the calibration tool and the measuring rod are in contact with each other. In Kon G, axis A2 is in the zero position, which means that the second robot arm is vertical. In Kon H, axis A2 has an angle $\phi_2$ which is known. In both configurations, the measuring rod 31 is rotated, and $x_m G$ and $x_m H$ are calculated by means of equations 4 and 6. From FIG. 16 the following relationship may be set up $$x_m G = (L_3 + L_{54} + L_c + L_{GH}) \tag{22}$$

$$x_m H = (L_2 \cdot \sin\phi_2 + L_3 + L_4 + L_c) \tag{23}$$

$$x_m H - x_m G = L_2 \cdot \sin\phi_2 - L_{GH} \tag{24}$$

$$L_2 = (x_m H - x_m G + L_{GH})/\sin\phi_2 \tag{25}$$

$$\Delta L_2 = L_2^{nom} - L_2 \tag{26}$$

The other arm's length errors may be measured in the same way.

What is claimed is:

1. An equipment for calibration of an industrial robot having a plurality of axes of rotation, said equipment comprising a measuring device having:
   1) means for rotatable connection to a known reference point,
   2) means for contact with the robot, or a tool carried by the robot, during a calibration process, and
   3) an axis of rotation which intersects the reference point when the measuring device is connected to the reference point,
   the measuring device further comprising a gravity sensor wherein the axis of the gravity sensor is substantially parallel to the axis of rotation of the measuring device, whereby the gravity sensor measures the angle between a gravity vector and axis of rotation.

2. An equipment according to claim 1, further comprising a calibration tool adapted to be carried by the robot.

3. An equipment according to claim 2, wherein the calibration tool comprises two rods positioned at an angle to each other.

4. An equipment according to claim 2, wherein the calibration tool comprises a gravity sensor.

5. An equipment according to claim 1, wherein the measuring device comprises a light source/photo detector adapted to be in optical contact with at least one photo detector/light source on the robot or a tool carried by the robot.

6. An equipment according to claim 1, wherein the measuring device comprises an attachment device for attachment and fixing of the measuring device onto the calibration tool.

7. A method for calibration of an industrial robot which has a plurality of axes of rotation, said method comprising the steps of:
   placing a measuring device comprising a gravity sensor for measuring an angle between a gravity vector and a predetermined reference axis of said measuring device into contact with said robot or a calibration tool carried by said robot;
   running said robot to at least two different configurations;
   reading an output signal of the gravity sensor in the different configurations at at least two different angles of rotation of said reference axis;
   calculating a direction ($\alpha$) of the reference axis relative to the gravity vector based on the read output signals; and
   calculating error parameters of said robot based on the read output signals.

8. A method according to claim 7, wherein
   before the robot assumes the different configurations, the measuring device and a calibration tool carried by the robot are fixed to each other,
   the different configurations are assumed by rotating one of the axes of rotation, whereby the measuring device follows the rotation, and
   the direction of the rotating axis of rotation relative to the gravity vector is calculated based on the read output signals.

9. A method according to claim 7, wherein before the robot assumes the different configurations, the measuring device is connected to a first reference point.

10. A method according to claim 9, wherein with knowledge of the distance between the reference point and a predetermined measuring point and the position of the measuring point, the position of the measuring point relative to the reference point is determined based on the read output signals.

11. A method according to claim 9, wherein before the robot assumes the next configuration, the measuring device is moved and connected to a second reference point.

12. A method according to claim 9, wherein the robot is run to the different configurations so that the calibration tool carried by the robot is brought into contact with the measuring device at different locations along the calibration tool.

13. A method according to claim 9, wherein the robot is run to the different configurations so that the calibration tool carried by the robot is brought into contact with the measuring device at different locations along the measuring device.

* * * * *